(12) United States Patent
Chien et al.

(10) Patent No.: US 11,803,117 B2
(45) Date of Patent: Oct. 31, 2023

(54) LIGHT SOURCE MODULE

(71) Applicant: Qisda Corporation, Taoyuan (TW)

(72) Inventors: Chih-Shiung Chien, Taoyuan (TW);
Ming-Kuen Lin, Taoyuan (TW);
Tsung-Hsun Wu, Taoyuan (TW);
Yi-Ling Lo, Taoyuan (TW)

(73) Assignee: Qisda Corporation, Taoyuan (TW)

(*) Notice: Subject to any disclaimer, the term of this patent is extended or adjusted under 35 U.S.C. 154(b) by 22 days.

(21) Appl. No.: 17/730,307

(22) Filed: Apr. 27, 2022

(65) Prior Publication Data

US 2022/0390819 A1 Dec. 8, 2022

(30) Foreign Application Priority Data

Jun. 3, 2021 (CN) .......................... 202110617300.4

(51) Int. Cl.
*G03B 21/20* (2006.01)
*G02B 27/14* (2006.01)
*G02B 27/10* (2006.01)

(52) U.S. Cl.
CPC ....... *G03B 21/204* (2013.01); *G02B 27/1006* (2013.01); *G02B 27/141* (2013.01); *G03B 21/206* (2013.01); *G03B 21/2013* (2013.01); *G03B 21/2066* (2013.01)

(58) Field of Classification Search
CPC . G03B 21/204; G02B 21/2013; G02B 27/141
See application file for complete search history.

(56) References Cited

U.S. PATENT DOCUMENTS

| | | | |
|---|---|---|---|
| 2014/0347842 A1* | 11/2014 | Copner | A61B 1/0646 362/84 |
| 2014/0355240 A1* | 12/2014 | Farchtchian | H04N 9/315 362/84 |
| 2017/0075203 A1* | 3/2017 | Cheng | H04N 9/3158 |
| 2021/0294201 A1* | 9/2021 | Suzuki | G03B 21/2013 |

\* cited by examiner

*Primary Examiner* — William N Harris

(57) ABSTRACT

A light source module including first and second light sources, first and second wavelength conversion units, first and second light-splitting units is provided. The first light source emits a first light having a first wavelength. The first wavelength conversion unit converts at least one portion of the first light into a first converted light having a second wavelength. The second light-splitting unit allows the light having the first wavelength to travel through and reflects the light having the second wavelength. The second light source emits a second light having the first wavelength. The second wavelength conversion unit converts at least one portion of the second light into a second converted light having the second wavelength. The first light-splitting unit disposed between the first and the second wavelength conversion units reflects the light having the first wavelength and allow the light having the second wavelength to travel through.

20 Claims, 6 Drawing Sheets

LIGHT SOURCE MODULE

This application claims the benefit of People's Republic of China application Serial No. 202110617300.4, filed on Jun. 3, 2021, the subject matter of which is incorporated herein by reference.

BACKGROUND OF THE INVENTION

Field of the Invention

The invention relates in general to a light source module.

Description of the Related Art

A conventional light source module provides at least one color light. Generally speaking, the light source of the light source module mostly emits a monochromatic light. To enrich the colors of the light emitted from the light source module, normally a wavelength conversion unit is required to change the wavelength of the light emitted from the light source, and more light-splitting units are required to obtain the desired color lights using the properties such as transmittance and to reflection. However, these elements will increase the size of the light source module. Therefore, it has become a prominent task for the industries to provide a new light source module capable of resolving the above problems.

SUMMARY OF THE INVENTION

The invention is directed to a light source module capable of resolving the above problems encountered in the prior art.

According to an embodiment of the present invention, a light source module including a first light source, a first wavelength conversion unit, a second light-splitting unit, a second light source, a second wavelength conversion unit and a first light-splitting unit is provided. The first light source emits a first light having a first wavelength. The first wavelength conversion unit converts at least one portion of the first light into a first converted light having a second wavelength. The second light-splitting unit allows the light having the first wavelength to travel through and allows the light having the second wavelength to be reflected. The second light source emits a second light having the first wavelength. The second wavelength conversion unit converts at least one portion of the second light into a second converted light having the second wavelength. The first light-splitting unit is disposed between the first wavelength conversion unit and the second wavelength conversion unit and is configured to reflect the light having the first wavelength and allow the light having the second wavelength to travel through.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
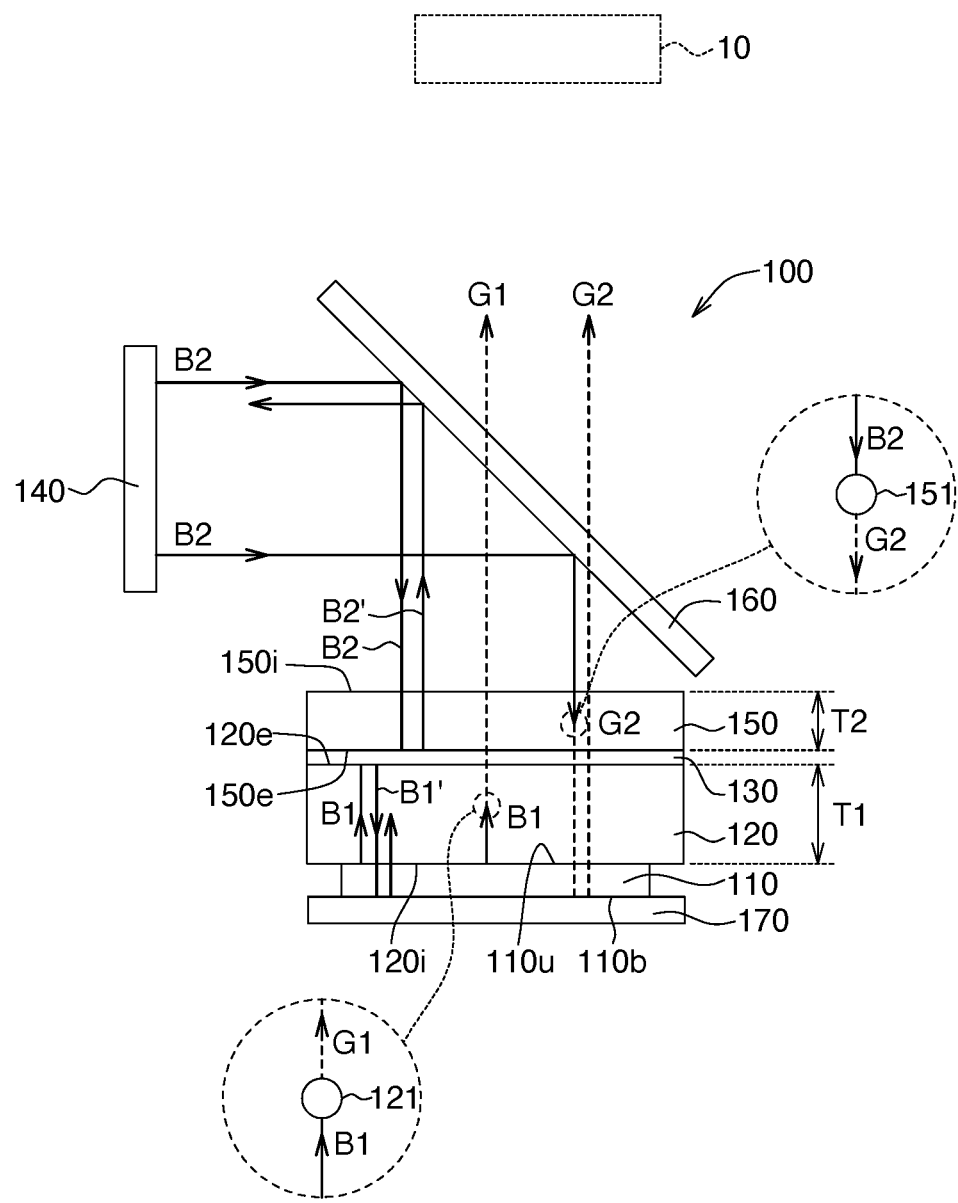
FIG. 1 is a schematic diagram of a light source module according to an embodiment of the present invention.

Referring to FIG. 1, a schematic diagram of a light source module 100 according to an embodiment of the present invention is shown. The light source module 100 could be applied to a device requiring light source, such as a projector, an illuminator, display or other types of devices. In terms of the application to projection devices, the light source module 100 may also be referred as a light combining module.

The light source module 100 includes a first light source 110, a first wavelength conversion unit 120, a first light-splitting unit 130, a second light source 140, a second wavelength conversion unit 150, a second light-splitting unit 160 and a reflection unit 170.

The first light source 110 is configured to emit a first light B1 having a first wavelength. The first wavelength conversion unit 120 is disposed opposite to the first light source 110 and is configured to convert at least one portion of the first light B1 into a first converted light G1 having a second wavelength. The second wavelength and the first wavelength are different. The second light-splitting unit 160 is disposed opposite to the first wavelength conversion unit 120 and is configured to allow one of the first wavelength and the second wavelength to travel through and allows the other one to be reflected. The second light source 140 is disposed opposite to the second light-splitting unit 160 and is configured emit a second light having the first wavelength B2. The second wavelength conversion unit 150 is disposed opposite to the second light-splitting unit 160 and is configured to convert at least one portion of the second light B2 into a second converted light having the second wavelength G2. The first light-splitting unit 130 is disposed between the first wavelength conversion unit 120 and the second wavelength conversion unit 150 and is configured to reflect the first wavelength and allow the second wavelength to travel through. In the present embodiment, the second light-splitting unit 160 allows the light having the first wavelength to be reflected, and allows the light having the second wavelength to travel through.

As disclosed above, the first converted light G1 and the second converted light G2 are converted by two separate wavelength conversion units. Due to relative relationship between the optical elements of the light source module 100, size of the light source module 100 is smaller. In addition, the light emitted by the light source module 100 is a mixed light obtained by mixing two converted lights having the second wavelength, therefore the luminous brightness could be increased.

The light having the first wavelength is such as one of red light, blue light and green light, the light having the second wavelength is such as another one of red light, blue light and green light. In the embodiments of the present invention, the light having the first wavelength and the light having the second wavelength respectively are exemplified by blue light and green light. The first light source 110 and the second light source 140 could be realized by light emitting diodes or laser light sources. The ratio of the green light to the white light is about 70%, and the larger the ratio of the green light, the larger the brightness of the white light. Since the light emitted by the light source module 100 is a mixed light of two green lights (the first converted light G1 and the second converted light G2), the brightness of the white light in the downstream of the optical path could be enhanced.

As indicated in FIG. 1, in terms of the optical path of the first light B1 and the first converted light G1, the first light B1 is emitted from the first light source 110, then is converted into a first converted light G1 by the first wavelength conversion unit 120. The first converted light G1 sequentially travels through the first light-splitting unit 130, the second wavelength conversion unit 150 and the second light-splitting unit 160, and then is outputted from the second light-splitting unit 160. After traveling through the second light-splitting unit 160, the first converted light G1 is incident to a module 10, such as illumination module or imaging module.

As indicated in FIG. 1, on the optical path of the second light B2 and the second converted light G2, the second light B2 emitted from the second light source 140 is reflected to the second wavelength conversion unit 150 from the second light-splitting unit 160, and is further converted into a second converted light G2 by the second wavelength conversion unit 150. The second converted light G2 sequentially travels through the first light-splitting unit 130, the first wavelength conversion unit 120, the first light source 110, the reflection unit 170, the first wavelength conversion unit 120, the first light-splitting unit 130, the second wavelength conversion unit 150 and the second light-splitting unit 160, and then is outputted from the second light-splitting unit 160. After traveling through the second light-splitting unit 160, the second converted light G2 is incident to the module 10.

As indicated in FIG. 1, the first light source 110 has a light-emitting surface 110u and a back surface 110b opposite to the light-emitting surface 110u, wherein the first light B1 is emitted from the light-emitting surface 110u. The reflection unit 170 is disposed on the back surface 110b and is configured to reflect the first light B1 and the second converted light G2.

As indicated in FIG. 1, the first light source 110 and the second light source 140 are respectively located on two opposite sides of the first light-splitting unit 130 for enabling the first light B1 emitted from the first light source 110 and the second light B2 emitted from the second light source 140 respectively to be incident to two opposite sides of the first light-splitting unit 130.

As indicated in FIG. 1, adjacent two of the first light source 110, the first wavelength conversion unit 120, the first light-splitting unit 130, the second wavelength conversion unit 150 and the reflection unit 170 contact each other so that light loss could be reduced. In terms of relative positions, the reflection unit 170, the first light source 110, the first wavelength conversion unit 120, the first light-splitting unit 130, the second wavelength conversion unit 150 and the second light-splitting unit 160 are sequentially arranged in a direction from the first light source 110 toward the second light-splitting unit 160 (such as along a straight line direction).

As indicated in FIG. 1, the first wavelength conversion unit 120 has a first surface 120i and a third surface 120e opposite to the first surface 120i; the second wavelength conversion unit 150 has a second surface 150i and a fourth surface 150e opposite to the second surface 150i; the third surface 120e and the fourth surface 150e are respectively located on two opposite sides of the first light-splitting unit 130. The first light B1 is incident to the first wavelength conversion unit 120 through the first surface 120i, then the first light B1 is converted into a first converted light G1 by the first wavelength conversion unit 120; the second light B2 is incident to the second wavelength conversion unit 150 through the second surface 150i, then the second light B2 is converted into a second converted light G2 by the second wavelength conversion unit 150. To summarize, the first light B1 and the second light B2 respectively are incident to two separate wavelength conversion units, then the first light B1 and the second light B2 are converted into the first converted light G1 and the second converted light G2 respectively by two separate wavelength conversion units.

The first wavelength conversion unit 120 and the second wavelength conversion unit 150 have the same wavelength conversion properties. As indicated in FIG. 1, the first wavelength conversion unit 120 includes several fluorescent particles 121 capable of exciting the light to convert the wavelength of the light. For example, the first wavelength conversion unit 120 converts the first light B1 having the first wavelength into the first converted light having the second wavelength G1. The second wavelength conversion unit 150 includes several fluorescent particles 151 capable of exciting the light to convert the wavelength of the light. For example, the second wavelength conversion unit 150 converts the second light B2 having the first wavelength into the second converted light G2 having the second wavelength.

As indicated in FIG. 1, the thickness T1 of the first wavelength conversion unit 120 is greater than the thickness T2 of the second wavelength conversion unit 150. In an embodiment, the thickness T1 is such as 1.1-3 times of the thickness T2, and could be even larger or smaller. In terms of actual size, the thickness T1 is such as 0.15-0.3 millimeters (mm), the thickness T2 is such as 0.1 mm-0.25 mm. Since the first wavelength conversion unit 120 has a certain thickness, the length of the optical path of the first light B1' reflected reciprocally between the first light-splitting unit 130 and the reflection unit 170 could be increased to increase the probability or efficiency of converting the first light B1' into the first converted light G1.

The first light-splitting unit 130 could be realized by a dichroic mirror. As indicated in FIG. 1, the first light B1 and the second light B2 are blocked by the first light-splitting unit 130, and therefore cannot travel through the first light-splitting unit 130. The first light-splitting unit 130 could reflect the first light B1 and the second light B2 having the first wavelength respectively back to the first wavelength conversion unit 120 and the second wavelength conversion unit 150 and allow the first converted light having the second wavelength G1 and the second converted light G2 having a third wavelength to travel through.

For example, as indicated in FIG. 1, since the first light-splitting unit 130 allows the first wavelength to be reflected, the first light B1 having the first wavelength (not converted by the first wavelength conversion unit 120) is reflected back to the first wavelength conversion unit 120 by the first light-splitting unit 130 (referred as the first light B1') to increase the probability or efficiency of converting the first light B1' into the first converted light G1. After the first light B1' is incident to the reflection unit 170, and then the first light B1' is reflected to the first wavelength conversion unit 120 to increase the probability or efficiency of converting the first light B1' into the first converted light G1. In addition, the first light source 110 and the first wavelength conversion unit 120 are disposed between the reflection unit 170 and the first light-splitting unit 130. Thus, the first light B1' could be reflected reciprocally between the first light-splitting unit 130 and the reflection unit 170 to increase the probability or efficiency of converting the first light B1' into the first converted light G1.

As indicated in FIG. 1, the second light B2 having the first wavelength is reflected back to the second wavelength conversion unit 150 by the first light-splitting unit 130 (referred as the second light B2'). After traveling through the second wavelength conversion unit 150, the second light B2' is incident to the second light-splitting unit 160, then the second light B2' is reflected off the light source module 100 from the second light-splitting unit 160 or is processed by the light source module 100. Since the ratio of the amount of light of the second light B2' to the amount of light of the second light B2 is below a predetermined ratio, the light loss caused by the second light B2 is small. The predetermined ratio is such as equivalent to or smaller than 5%.

The second light-splitting unit 160 could be realized by a dichroic mirror. As indicated in FIG. 1, the configuration angle of the second light-splitting unit 160 (such as relative to the optical axis direction of the second light B2 or relative to the optical axis direction of the converted light) is such as 45°, but the embodiments of the present invention are not limited thereto. Moreover, the first light source 110, the first wavelength conversion unit 120, the first light-splitting unit 130, the second light source 140, the second wavelength conversion unit 150 and the reflection unit 170 are located on the same side of the second light-splitting unit 160, therefore the second light B2, the first converted light G1 and the second converted light G2 are incident to the same side of the second light-splitting unit 160.

Figure 2:
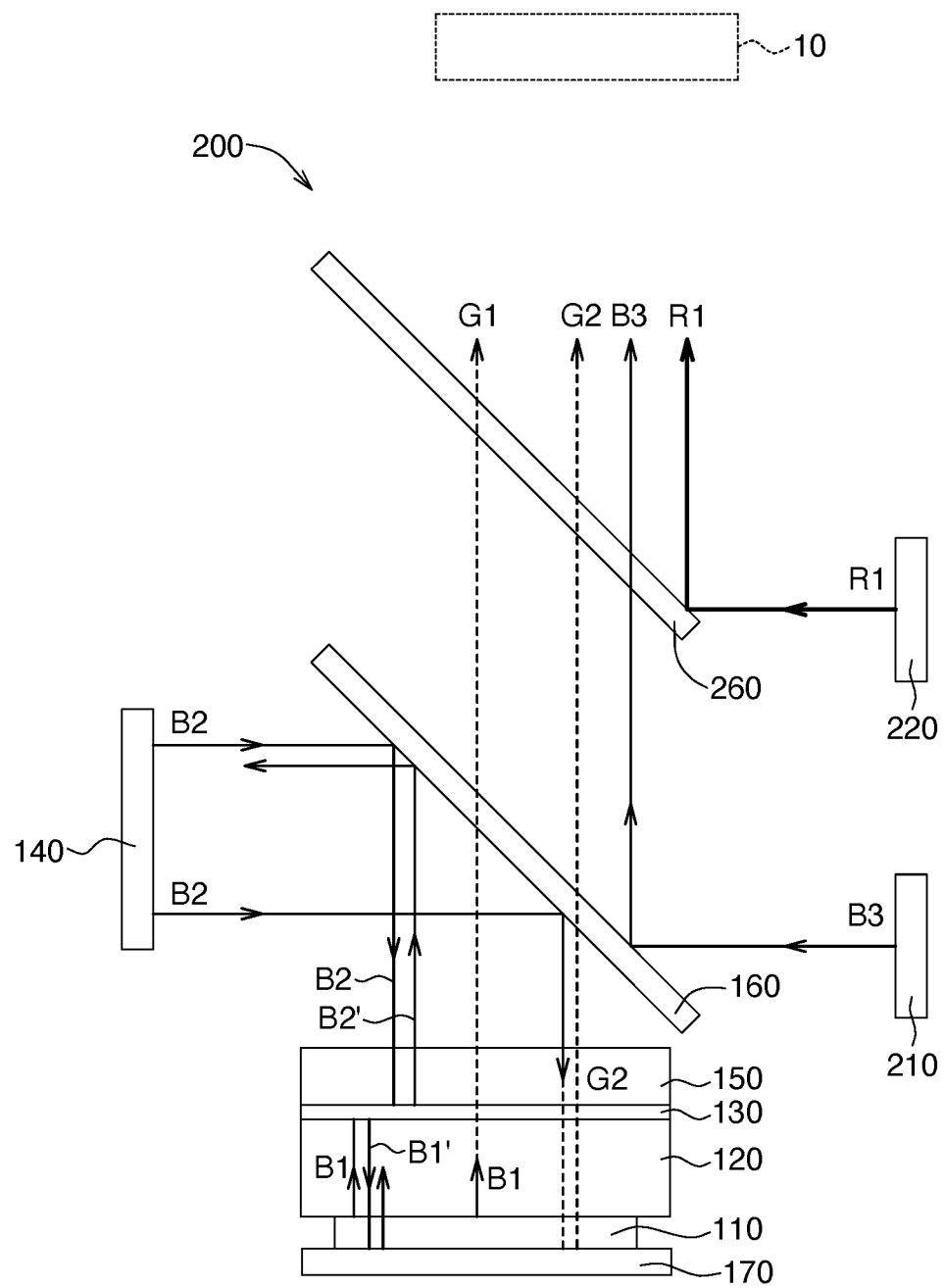
FIG. 2 is a schematic diagram of a light source module according to another embodiment of the present invention.

Referring to FIG. 2, a schematic diagram of a light source module 200 according to another embodiment of the present invention is shown. The light source module 200 includes a first light source 110, a first wavelength conversion unit 120, a first light-splitting unit 130, a second light source 140, a second wavelength conversion unit 150, a second light-splitting unit 160, the reflection unit 170, a third light source 210, a fourth light source 220 and a third light-splitting unit 260. Technical features of the light source module 200 of the embodiments of the present invention are similar or identical to that of the light source module 100 except that the light source module 200 further includes a third light source 210 and a fourth light source 220. The third light source 210 and the fourth light source 220 could be realized by light emitting diodes or laser light sources. The third light-splitting unit 260 could be realized by a dichroic mirror.

The third light source 210 is disposed opposite to the second light-splitting unit 160 and is configured to emit the third light B3 having the first wavelength. The second light-splitting unit 160 is configured to allow the light having the first wavelength (such as the second light B2 and the third light B3) to be reflected and allow the light having the second wavelength (such as the first converted light G1 and the second converted light G2) to travel through. After the third light B3 is reflected from the second light-splitting unit 160, the third light B3 is incident to the module 10 through the third light-splitting unit 260. Thus, the first converted light G1, the second converted light G2 and the third light B3 with different light colors are incident to the module 10 through the second light-splitting unit 160, so that the color light provided by the light source module 200 has versatile color change.

As indicated in FIG. 2, the fourth light source 220 is configured to emit a fourth light R1 having a third wavelength, wherein the third wavelength, the second wavelength and the first wavelength are different. In the present embodiment, the light having the first wavelength is such as one of red light, blue light and green light, the light having the second wavelength is such as another one of red light, blue light and green light, and the light having the third wavelength is such as the remaining one of red light, blue light and green light. In the embodiments of the present invention, the first wavelength, the second wavelength and the third wavelength respectively are exemplified by blue light, green light and red light.

The third light-splitting unit 260 is disposed opposite to the second light-splitting unit 160 and is configured to allow the light having the first wavelength (such as the third light B3) to travel through, allow the light having the second wavelength (such as the first converted light G1 and the second converted light G2) to travel through and allow the light having the third wavelength (such as the fourth light R1) to be reflected. After the fourth light R1 is reflected from the third light-splitting unit 260, the fourth light R1 is incident to the module 10. Thus, the first converted light G1, the second converted light G2, the third light B3 and the fourth light R1 with different light colors are incident to the module 10 through the third light-splitting unit 260, so that the color light provided by the light source module 200 has versatile color change.

As indicated in FIG. 2, the third light source 210 and the second light source 140 are respectively located on two opposite sides of the second light-splitting unit 160, so that the third light B3 emitted from the third light source 210 and the second light B2 emitted from the second light source 140 are respectively reflected to module 10 and the second wavelength conversion unit 150 in two opposite directions.

As indicated in FIG. 2, the third light-splitting unit 260 and the second wavelength conversion unit 150 are respectively located on two opposite sides of the second light-splitting unit 160, so that the first converted light G1, the second converted light G2 and the third light B3 transmitted through the second light-splitting unit 160 could be incident to the third light-splitting unit 260 along a straight line optical path. That is, there is no need to arrange any optical elements between the third light-splitting unit 260 and the second light-splitting unit 160 to change the direction of the light.

Figure 3:
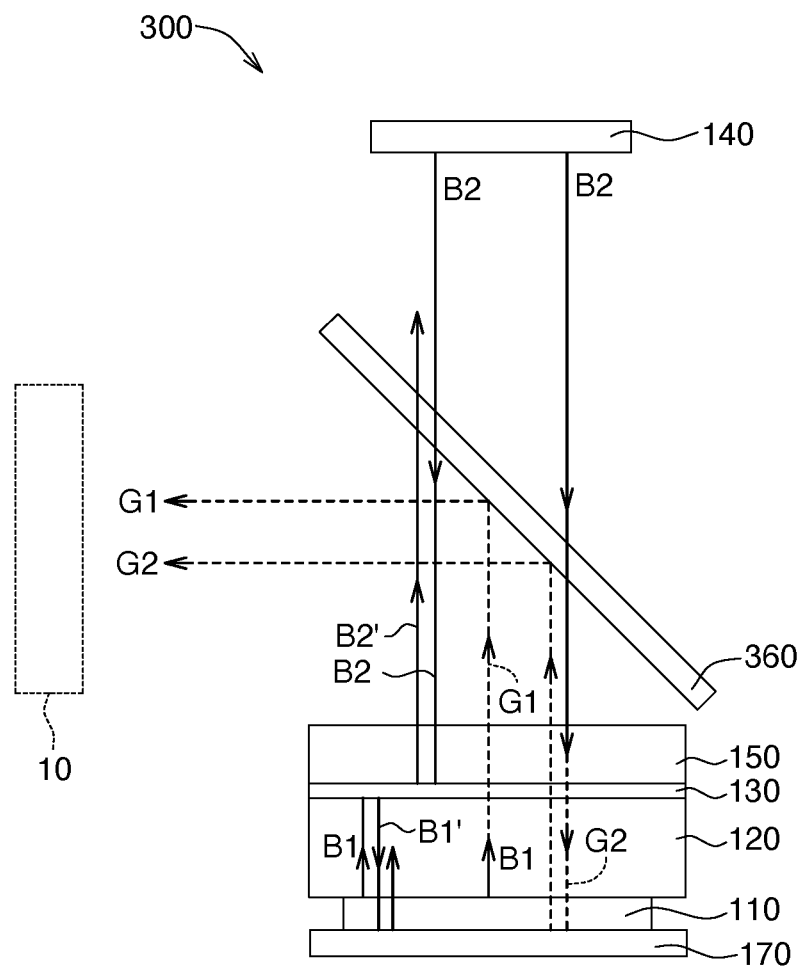
FIG. 3 is a schematic diagram of a light source module according to another embodiment of the present invention.

Referring to FIG. 3, a schematic diagram of a light source module 300 according to another embodiment of the present invention is shown. The light source module 300 includes a first light source 110, a first wavelength conversion unit 120, a first light-splitting unit 130, a second light source 140, a second wavelength conversion unit 150, a second light-splitting unit 360 and a reflection unit 170. Technical features of the light source module 300 of the embodiments of the present invention are similar or identical to that of the light source module 100 except that the light splitting property of the second light-splitting unit 360 of the light source module 300 is different from the light splitting property of the second light-splitting unit 160. The second light-splitting unit 360 could be realized by a dichroic mirror.

In the present embodiment, the second light-splitting unit 360 allows the light having the first wavelength (such as the second light B2) to travel through, and allows the light having the second wavelength (such as the first converted light G1 and the second converted light G2) to be reflected.

As indicated in FIG. 3, in the optical path of the first light B1 and the first converted light G1, the first light B1 emitted from the first light source 110 is converted into the first converted light G1 by the first wavelength conversion unit 120; the first converted light G1 sequentially travels through the first light-splitting unit 130, the second wavelength conversion unit 150 and the second light-splitting unit 360 and is reflected to the module 10 by the second light-splitting unit 160.

As indicated in FIG. 3, in the optical path of the second light B2 and the second converted light G2, after traveling through the second light-splitting unit 360, the second light B2 emitted from the second light source 140 is incident to the second wavelength conversion unit 150, and then is converted into the second converted light G2 by the second wavelength conversion unit 150; after sequentially traveling through the first light-splitting unit 130, the first wavelength conversion unit 120, the first light source 110, the reflection unit 170, the first wavelength conversion unit 120, the first light-splitting unit 130, the second wavelength conversion unit 150 and the second light-splitting unit 360, the second converted light G2 is reflected to the module 10 by the second light-splitting unit 360.

As indicated in FIG. 3, the first wavelength conversion unit 120 and the second light source 140 are respectively located on two opposite sides of the second light-splitting unit 360, therefore the second light B2 emitted from the second light source 140 and the converted light converted by the wavelength conversion unit (the first converted light G1 and the second converted light G2) respectively are incident to two opposite sides of the second light-splitting unit 360.

Figure 4:
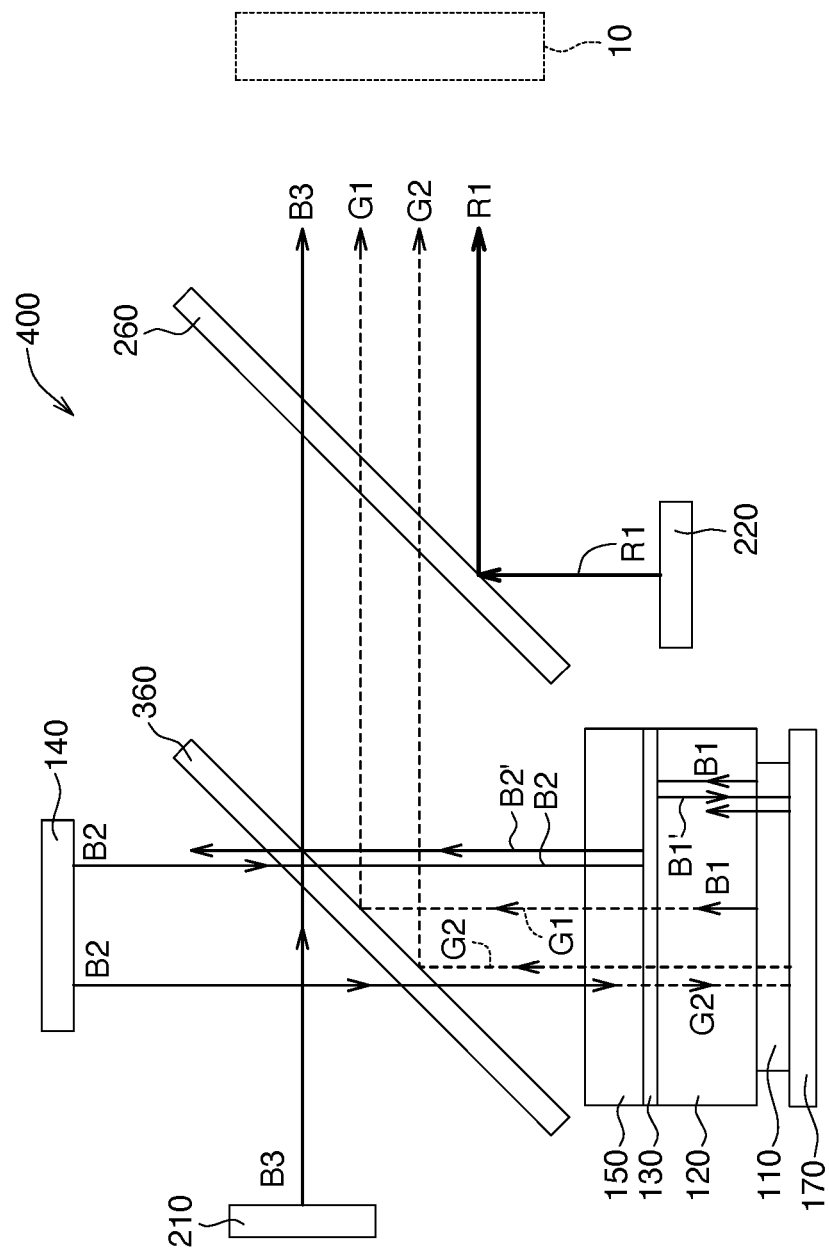
FIG. 4 is a schematic diagram of a light source module according to another embodiment of the present invention.

Referring to FIG. 4, a schematic diagram of a light source module 400 according to another embodiment of the present invention is shown. The light source module 400 includes a first light source 110, a first wavelength conversion unit 120, a first light-splitting unit 130, a second light source 140, a second wavelength conversion unit 150, a second light-splitting unit 360, a reflection unit 170, a third light source 210, a fourth light source 220 and a third light-splitting unit 260. Technical features of the light source module 400 of the embodiments of the present invention are similar or identical to that of the light source module 300 except that the light source module 400 further includes a third light source 210, a fourth light source 220 and a third light-splitting unit 260.

As indicated in FIG. 4, the third light source 210 is disposed opposite to the second light-splitting unit 160 and is configured to emit the third light B3 having the first wavelength. The second light-splitting unit 360 allows the light having the first wavelength (such as the second light B2 and the third light B3) to travel through and allows the light having the second wavelength (such as the first converted light G1 and the second converted light G2) to be reflected. The third light B3 emitted from the third light source 210 sequentially travels through the second light-splitting unit 160 and the third light-splitting unit 260 to be incident to the module 10. Thus, the first converted light G1, the second converted light G2 and the third light B3 with different light colors is incident to the module 10 through the second light-splitting unit 360, so that the color light provided by the light source module 400 has versatile color change.

As indicated in FIG. 4, the fourth light source 220 is configured to emit a fourth light R1 having the third wavelength, wherein the third wavelength, the second wavelength and the first wavelength are different. In the present embodiment, the light having the first wavelength is such as one of red light, blue light and green light, the light having the second wavelength is such as another one of red light, blue light and green light, and the light having the third wavelength is such as the remaining one of red light, blue light and green light. In the embodiments of the present invention, the first wavelength, the second wavelength and the third wavelength respectively are exemplified by blue light, green light and red light.

As indicated in FIG. 4, the third light-splitting unit 260 is disposed opposite to the second light-splitting unit 360 and is configured to allow the light having the first wavelength (such as the third light B3) to travel through, allow the light having the second wavelength (such as the first converted light G1 and the second converted light G2) to travel through and allow the light having the third wavelength (such as the fourth light R1) to be reflected. The fourth light R1 reflected from the third light-splitting unit 260 is incident to the module 10. Thus, the first converted light G1, the second converted light G2, the third light B3 and the fourth light R1 with different light colors are incident to the module 10 through the third light-splitting unit 260, so that the color light provided by the light source module 400 has versatile color change.

As indicated in FIG. 4, the second light source 140 and the second wavelength conversion unit 150 are respectively located on two opposite sides of the second light-splitting unit 360, so that the second light-splitting unit 360 is located on the optical path of the second light B2 emitted from the second light source 140 and the second converted light G2 emitted from the second wavelength conversion unit 150.

As indicated in FIG. 4, the third light source 210 and the second light source 140 respectively are located on the same side of the second light-splitting unit 360; the third light B3 emitted from the third light source 210 and the second light B2 emitted from the second light source 140 are incident to the same side of the second light-splitting unit 360.

Figure 5:
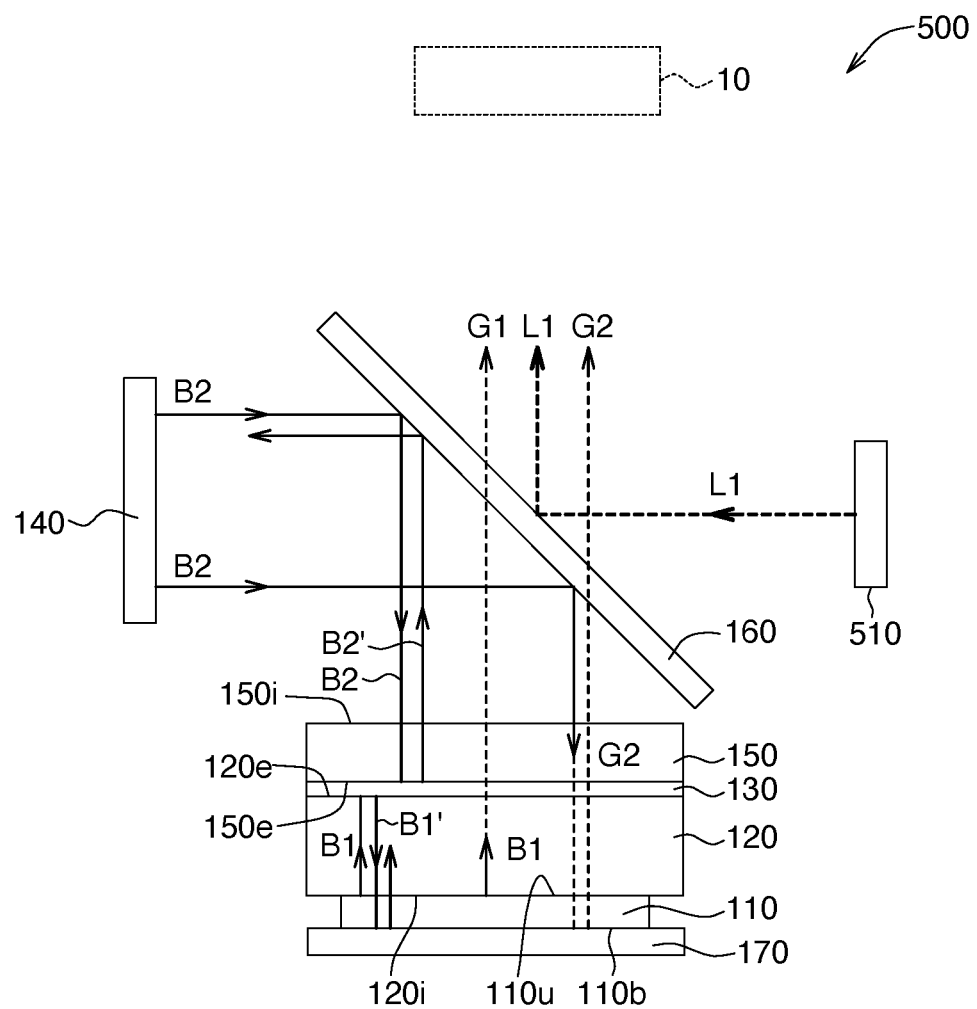
FIG. 5 is a schematic diagram of a light source module according to another embodiment of the present invention.

Referring to FIG. 5, a schematic diagram of a light source module 500 according to another embodiment of the present invention is shown. The light source module 500 includes a first light source 110, a first wavelength conversion unit 120, a first light-splitting unit 130, a second light source 140, a second wavelength conversion unit 150, a second light-splitting unit 160, a reflection unit 170 and a third light source 510. Technical features of the light source module 500 of the embodiments of the present invention are similar or identical to that of the light source module 100 except that the light source module 500 further includes a third light source 510.

The third light source 510 is disposed opposite to the second light-splitting unit 160 and is configured to emit a third light L3. The third light L3 has a wavelength, such as the first wavelength or the third wavelength, different from the second wavelength. The second light-splitting unit 160 is configured to reflect the third light L3 and allow the light having the second wavelength (such as the first converted light G1 and the second converted light G2) to travel through. Thus, the first converted light G1, the second converted light G2 and the third light L3 with different light colors are incident to the module 10 through the second light-splitting unit 160, so that the color light provided by the light source module 500 has versatile color change.

Figure 6:
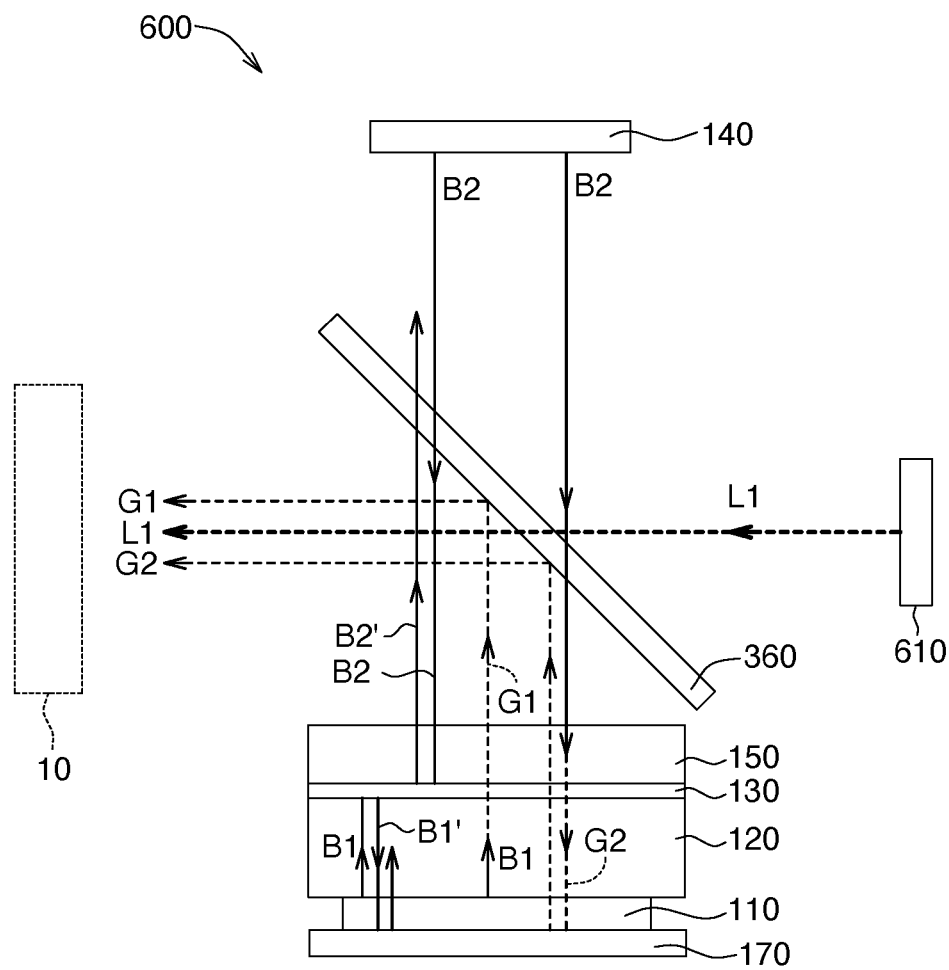
FIG. 6 is a schematic diagram of a light source module according to another embodiment of the present invention.

Referring to FIG. 6, a schematic diagram of a light source module 500 according to another embodiment of the present invention is shown. The light source module 600 includes a first light source 110, a first wavelength conversion unit 120, a first light-splitting unit 130, a second light source 140, a second wavelength conversion unit 150, a second light-splitting unit 360, a reflection unit 170 and a third light source 610. Technical features of the light source module 500 of the embodiments of the present invention are similar or identical to that of the light source module 300 except that the light source module 600 further includes a third light source 610.

The third light source 610 is disposed opposite to the second light-splitting unit 260 configured to emit a third light L3. The third light L3 has a wavelength different, such as the first wavelength or the third wavelength, from the second wavelength. The second light-splitting unit 360 allows the third light L3 to travel through and allows the light having the second wavelength (such as the first converted light G1 and the second converted light G2) to be reflected. Thus, the first converted light G1, the second converted light G2 and the third light L3 with different light colors are incident to the module 10 through the second light-splitting unit 360, so that the color light provided by the light source module 600 has versatile color change.

To summarize, according to the embodiments of the present invention, an optical module is provided. The optical module could be applied to any device requiring the light and includes two light sources, two wavelength conversion units and two light-splitting units. Two lights emitted by the two light sources respectively are converted into two converted lights having identical wavelength by the two wavelength conversion units and are outputted via one of the light-splitting units, and the other light-splitting unit is located between the two wavelength conversion units for reflecting the light emitted by one of the light sources back to one of the wavelength conversion units to increase conversion efficiency.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source module, comprises:
    a first light source configured to emit a first light having a first wavelength;
    a first wavelength conversion unit disposed opposite to the first light source and configured to convert at least one portion of the first light into a first converted light having a second wavelength, wherein the second wavelength and the first wavelength are different;
    a second light-splitting unit disposed opposite to the first wavelength conversion unit and configured to allow one of the first wavelength and the second wavelength to travel through and allow the other one to be reflected;
    a second light source disposed opposite to the second light-splitting unit and configured to emit a second light having the first wavelength;
    a second wavelength conversion unit disposed opposite to the second light-splitting unit and configured to convert at least one portion of the second light into a second converted light having the second wavelength; and
    a first light-splitting unit disposed between the first wavelength conversion unit and the second wavelength conversion unit and configured to reflect the first wavelength and allow the second wavelength to travel through.

2. The light source module according to claim 1, wherein the first light-splitting unit is configured to respectively reflect the first and second lights having the first wavelength to the first wavelength conversion unit and the second wavelength conversion unit and allow the first converted light having the second wavelength to travel through.

3. The light source module according to claim 1, further comprises:
    a third light source disposed opposite to the second light-splitting unit and configured to emit a third light having a wavelength different from the second wavelength;
    wherein the second light-splitting unit is configured to reflect the third light and allow the first and second converted lights having the second wavelength to travel through.

4. The light source module according to claim 1, further comprises:
    a third light source disposed opposite to the second light-splitting unit and configured to emit a third light having the first wavelength;
    wherein the second light-splitting unit is configured to reflect the second and third lights having the first wavelength and allow the first and second converted lights having the second wavelength to travel through.

5. The light source module according to claim 4, wherein the third light source and the second light source are respectively located on two opposite sides of the second light-splitting unit.

6. The light source module according to claim 1, further comprises:
    a third light source disposed opposite to the second light-splitting unit and configured to emit a third light having the first wavelength;
    wherein the second light-splitting unit is configured to allow the second and third lights having the first wavelength to travel through and reflect the first and second converted lights having the second wavelength.

7. The light source module according to claim 6, wherein the third light source and the second light source are located on the same side of the second light-splitting unit.

8. The light source module according to claim 1, further comprises:
    a fourth light source configured to emit a fourth light having a third wavelength, wherein the third wavelength, the second wavelength and the first wavelength are different; and
    a third light-splitting unit disposed opposite to the second light-splitting unit and configured to allow the third light having the first wavelength to travel through, allow the first and second converted lights having the second wavelength to travel through and reflect the fourth light having the third wavelength.

9. The light source module according to claim 8, wherein the third light-splitting unit and the second wavelength conversion unit are respectively located on two opposite sides of the second light-splitting unit.

10. The light source module according to claim 8, wherein the second light source and the second wavelength conversion unit are respectively located on two opposite sides of the second light-splitting unit.

11. The light source module according to claim 1, further comprises a reflection unit, wherein the first light source and the first wavelength conversion unit are disposed between the reflection unit and the first light-splitting unit.

12. The light source module according to claim 1, wherein the first light source has a light-emitting surface and a back surface opposite to the light-emitting surface, the first light is emitted from the light-emitting surface, and the light source module further comprises:
    a reflection unit disposed on the back surface and configured to reflect the first light and the second converted light.

13. The light source module according to claim 1, wherein the first wavelength conversion unit has a thickness greater than that of the second wavelength conversion unit.

14. The light source module according to claim 1, wherein the first light source, the first wavelength conversion unit, the first light-splitting unit, the second wavelength conversion unit and the second light-splitting unit are sequentially arranged in a direction from the first light source toward the second light-splitting unit.

15. The light source module according to claim 1, wherein adjacent two of the first wavelength conversion unit, the first light-splitting unit and the second wavelength conversion unit contact each other.

16. The light source module according to claim 1, wherein the first light source and the first wavelength conversion unit contact each other.

17. The light source module according to claim 1, wherein the first light source and the second light source are respectively located on two opposite sides of the first light-splitting unit.

18. The light source module according to claim 1, wherein the first wavelength conversion unit has a first surface and a third surface opposite to the first surface, the second wavelength conversion unit has a second surface and a fourth surface opposite to the second surface, the third surface and the fourth surface are respectively located on two opposite sides of the first light-splitting unit, the first light is incident to the first surface, and the second light is incident to the second surface.

19. The light source module according to claim 1, wherein the second light, the first converted light and the second converted light are incident to the same surface of the second light-splitting unit.

20. The light source module according to claim 1, wherein the second light and the first converted light respectively are incident to two opposite sides of the second light-splitting unit.

* * * * *